Sept. 23, 1969  Z. SOWA  3,469,059
INDEXING SPOT WELDING APPARATUS
Filed April 12, 1967  9 Sheets-Sheet 1

FIG.1

ZYGMUNT SOWA
INVENTOR.

BY John R. Faulkner
Glenn S. Arendsen
ATTORNEYS

Sept. 23, 1969     Z. SOWA     3,469,059
INDEXING SPOT WELDING APPARATUS
Filed April 12, 1967     9 Sheets-Sheet 6

ZYGMUNT SOWA
INVENTOR.

BY *John R. Faulkner*
*Glenn S. Arendsen*
ATTORNEYS

Sept. 23, 1969  Z. SOWA  3,469,059
INDEXING SPOT WELDING APPARATUS
Filed April 12, 1967  9 Sheets-Sheet 7

ZYGMUNT SOWA
INVENTOR.

BY John R. Faulkner
Glenn S. Arendsen
ATTORNEYS

Sept. 23, 1969     Z. SOWA     3,469,059
INDEXING SPOT WELDING APPARATUS
Filed April 12, 1967     9 Sheets-Sheet 9

ZYGMUNT SOWA
INVENTOR.

BY *John L. Faulkner*
*Glenn S. Arendsen*
ATTORNEYS

· # United States Patent Office 3,469,059
Patented Sept. 23, 1969

3,469,059
INDEXING SPOT WELDING APPARATUS
Zygmunt Sowa, Detroit, Mich., assignor to Ford Motor Company, Dearborn, Mich., a corporation of Delaware
Filed Apr. 12, 1967, Ser. No. 630,276
Int. Cl. B23k 11/10
U.S. Cl. 219—80                                       7 Claims

ABSTRACT OF THE DISCLOSURE

This indexing mechanism is used to index a spot welding machine along a track to weld vehicle body components at equally spaced places. The mechanism comprises two basic assemblies, a frame carrying the spot welding gun and an indexing carriage carried by and movable relative to the frame. Retraction of a vertical air cylinder attached to the carriage acts through an arm to engage a frame positioning member in linear gear teeth on the track, thereby holding the gun during the welding step. Simultaneously with the welding step a horizontal air cylinder attached to the frame extends to move the indexing carriage along the track a distance equal to the spacing between welds.

When the welding step ends, the vertical cylinder extends to engage a carriage positioning member in the gear teeth and sequentially disengage the frame positioning member from the gear teeth. The horizontal cylinder then retracts to draw the frame and gun up to the next welding position, the vertical cylinder retracts to re-engage the frame positioning member with the gear teeth and the next welding step commences. A control circuit for the mechanism produces the above operation with a minimum of components and also permits the machine to weld while indexing in the reverse direction.

Summary of the invention

Spot welding sheet metal components into a vehicle body is an exacting task requiring the operator of a bulky spot welding gun to position the gun normal to the surface being welded, produce the weld, and move a uniform distance to the next weld as rapidly as possible. With over 4,000 welds in a vehicle body, proper welding is a massive assmebly problem.

Many prior art welding machines used complicated connecting rod systems to index the work instead of the welding gun. Feeder fingers and clamps gripped the work at various stages to alternately hold the work stationary during the welding operation and move the work through the welding station during the indexing operation. Although adapted to welding large components, these machines not only are impractical because of the work required to move the components being welded but also weld at a slow pace because the welding and indexing operations are completely separate in time. Speeding up the welding pace by using multiple electrodes strains the equipment producing the welding current and also increases equipment investment.

Prior art welding machines that indexed the welding gun rather than the work generally used a similar approach in indexing the equipment separately from the welding operation and usually comprised complicated cam operated indexing mechanisms. Generally, there was no provision in the prior art machines to omit a weld while continuing to index the machine or to weld while indexing in both directions. Furthermore, it was impossible to change the position of the welds without making extensive changes to the equipment. None of the prior art welding machines have attained a reasonable degree of commercial success in welding body sheet metal components.

A spot welding gun controlled by the indexing mechanism of this invention produces uniform spot welds rapidly and efficiently, thereby easing the effort required of an operator and increasing the operator's output. The mechanism comprises a frame member carrying the spot welding gun along a track having a stop means positioned thereon. A first motive device is fastened to the frame member and acts parallel to the track. Mounted on the frame member is an indexing carriage movable relative to the frame member by the first motive device. A frame positioning member, slidable in the frame to engage and disengage the stop means, is actuated by a second motive device fastened to the carriage that also actuates a carriage positioning member. The second motive device engages the carriage positioning member with the stop means when disengaging the frame positioning member from the stop means and disengages the carriage positioning member when engaging the frame positioning member.

Indexing motion is provided by the first motive device and positioning is provided by the second motive device. A control circuit actuates the first and second motive devices in such a manner that the frame positioning member engages the stop means to hold the frame and spot welding gun stationary for the welding operation while simultaneously actuating the first motive device to advance the carriage to the next position. In addition, the control circuit provides for welding while indexing the welding gun in either direction along the track.

Preferably, both motive devices are fluid operated pistons and the stop means is a set of linear gear teeth fastened to the track. The piston making up the second motive device acts perpendicular to the track and is connected directly to the carriage positioning member so extending the piston engages the carriage positioning member with the gear teeth. In addition, an arm attached to the carriage is moved away from the track during the last portion of the extension, and the frame positioning member rides on the arm so it disengages from the gear teeth shortly after the carriage positioning member engages.

During retraction of this piston, the frame positioning member engages the gear teeth and then the carriage positioning member is disengaged. With the frame positioning member engaged, extending or retracting the piston of the first motive device, depending on the direction in which the machine is indexing, indexes the carriage to the position of the next spot weld. During this indexing, the spot welding gun produces a spot weld.

Switches in the control circuit are actuated by members at each end of the track to first set up the mechanism for operation in the reverse direction and then stop the mechanism. An additional switch actuated by a member positioned anywhere along the track prevents a welding operation at that position while permitting the indexing mechanism to continue. A timer in the control circuit insures a constant time cycle for each spot weld and appropriate switches prevent movement of the gun until after the weld has been produced and full indexing has been completed.

Brief description of the drawings

FIGURES 3–6 are phantom views of the operational stages of the machine with the active portion of the mechanism in each stage having cross hatching at its edges; in FIGURE 3, the frame and gun are stationary, the gun is welding, and the carriage is indexing; in FIGURE 4, welding has ended and the vertical cylinder is extending to engage the carriage positioning member and disengage the frame positioning member; in FIGURE 5 the carriage is stationary and the horizontal cylinder is retracting to index the frame and gun to the next position; and in FIGURE 6, the vertical cylinder is retracting to engage the frame positioning member and disengage the carriage positioning member.

Detailed description

Figure 1:
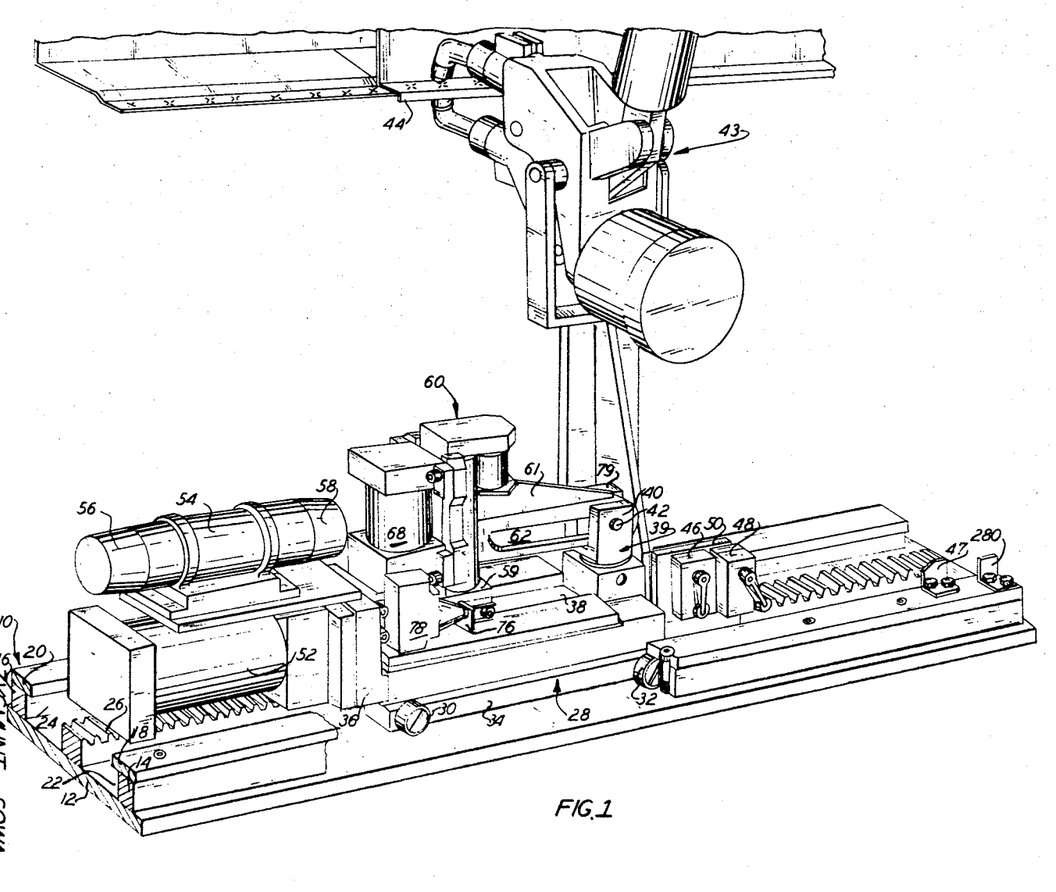
FIGURE 1 is a perspective view of a spot welding gun using the indexing mechanism of this invention showing the track, frame, gun, carriage, pneumatic cylinders, a directional valve and limit switches.
Figure 2:
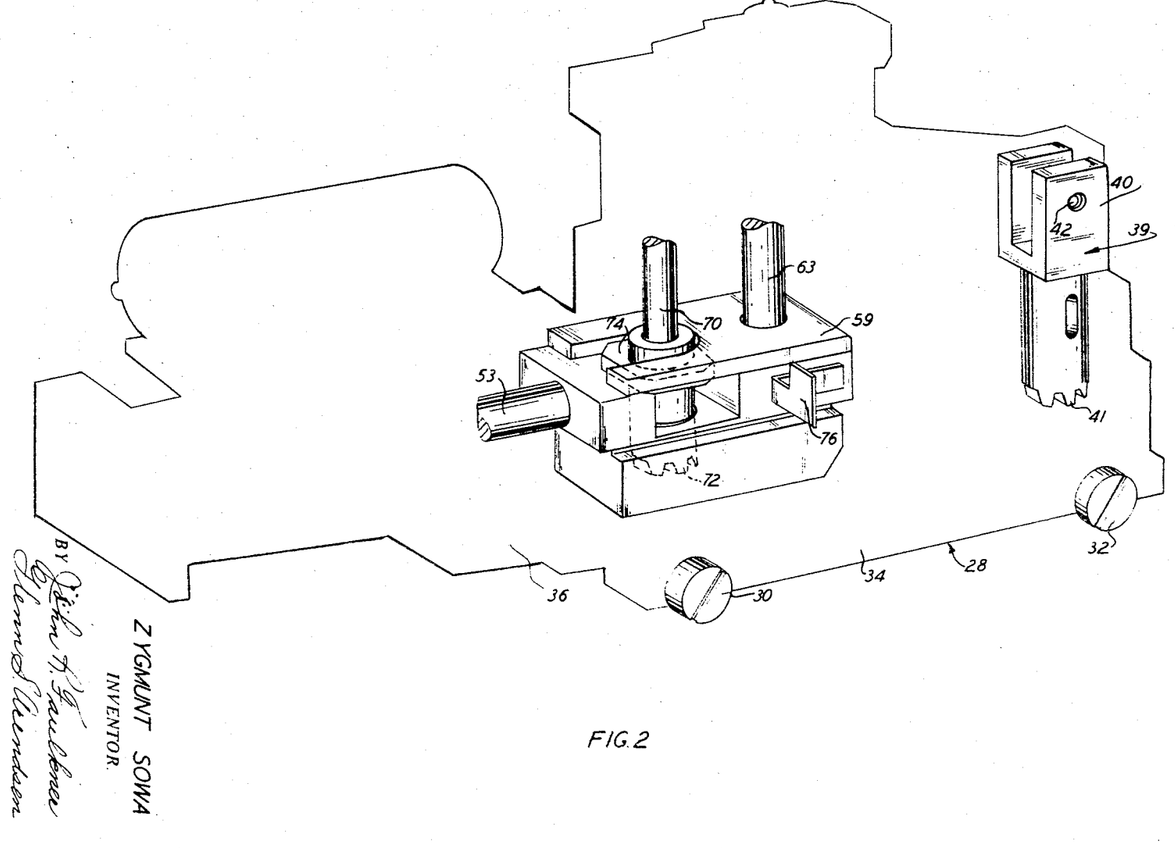
FIGURE 2 is a phantom view similar to FIGURE 1 showing the carriage base, the frame and carriage positioning members, and the plungers of the vertical and horizontal cylinders.

Referring to FIGURES 1 and 2, the track for the indexing mechanism of this invention is indicated generally by the numeral 10. Track 10 comprises an elongated base 12 having upstanding guides 14 and 16 fastened along its longitudinal edges. Ledges 18 and 20 are fastened to the tops of guides 14 and 16, respectively, and overhang the inner sides thereof to form longitudinal channels 22 and 24. A member having upwardly facing linear gear teeth 26, the stop means, is fastened to base 12 between guides 14 and 16.

The frame 28 of the mechanism rides on track 10 with rollers 30, 32 and appropriate rollers (not shown) on the other side of frame 28 positioning the frame laterally by locating in channels 22 and 24. Rollers 30 and 32 are mounted on the main portion 34 of frame 28 which has attached a trailer portion 36 that rides a short distance above track 10. Main portion 34 has a longitudinal opening 38 directly above gear teeth 26. A frame positioning member 39 having a U-shaped upper portion 40 and gear teeth 41 at its lower end (see FIGURE 2) is slidable vertically in a bore located in main portion 34 just ahead of opening 38. A journal 42 is located between the legs of U-shaped upper portion 40.

Attached to main portion 34 is a spot welding gun 43 adapted to produce welds on a body member 44. Body member 44 is held stationary with respect to track 10 by conventional means (not shown). A direction reversing limit switch 46 and a weld interrupting limit switch 48 are mounted on an upstanding plate 50 attached to the front of main portion 34. At each end of track 10, a ramp 47 (only one of which is shown) is positioned to contact the plunger of switch 46.

Trailer portion 36 carries a horizontal pneumatic cylinder 52 having a horizontally acting piston fastened to rod 53 (see FIGURE 2). A directional air valve 54 is mounted on portion 36 above cylinder 52 and has solenoids 56 and 58 for operating air valve 54 mounted at each end thereof.

Slidably mounted on main portion 34 above opening 38 is the base 59 of an indexing carriage 60. A longitudinally extending arm 61 having a slot 62 therein is positioned above base 59 on a vertical guide pin 63 (see FIGURE 2) that permits arm 61 to move vertically with respect to base 59 but prevents horizontal movement therebetween. Arm 61 rides in U-shaped upper portion 40 of frame positioning member 39 so journal 42 is positioned in slot 62. The rod 53 of horizontal cylinder 52 is connected to base 59, which slides longitudinally on main portion 34 between limits established by the stroke of the piston.

A vertically acting pneumatic cylinder 68 is attached to arm 61 and has the rod 70 attached to its piston extending through opening 38 where gear teeth 72 on the bottom of rod 70 are movable into and out of engagement with gear teeth 26. A flange 74 located on the shank of rod 70 is positioned so it contacts base 59 after gear teeth 72 engage gear teeth 26 but before the piston in cylinder 68 reaches the full extent of its travel. Further extension of rod 70 acts through flange 74 to lift cylinder 68 and arm 61 off base 59 a distance sufficient to disengage teeth 41 of frame positioning member 40 from teeth 26.

At one side of base 59, a wing 76 contacts the plunger of a limit switch 78 fastened to main portion 34 when carriage 60 is near its trailer portion end. A similar wing contacts the plunger of a limit switch 79 located on the other side of carriage 60 when carriage 60 is near its member 39 end.

Construction of the pneumatic and electrical control circuits

Figure 7A:
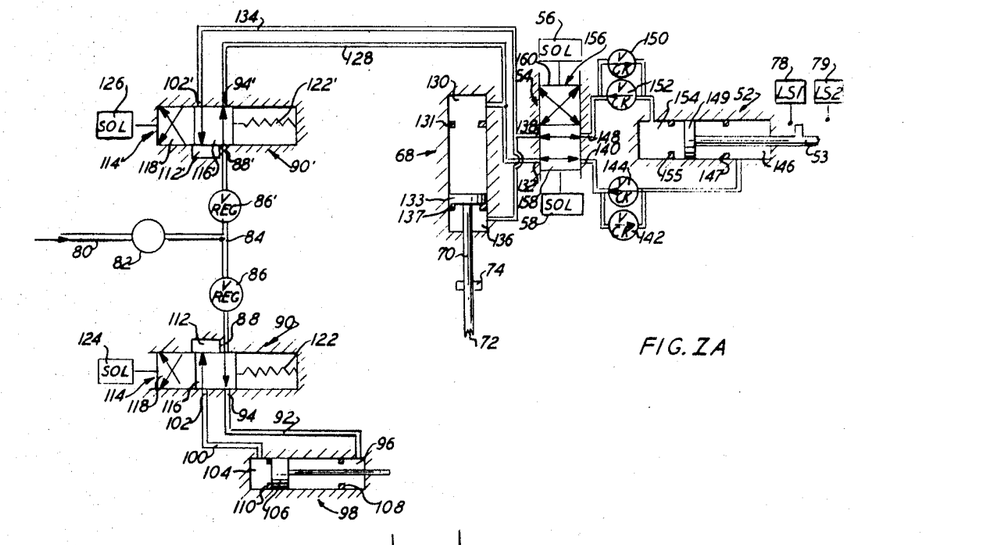
FIGURES 7a and 7b are schematics of the pneumatic and electrical systems, respectively, with the mechanism turned off and the carriage in some intermediate position along its travel length.

Referring to FIGUURE 7a, a high pressure air line 80 is connected through an on-off valve 82 to a pipe T 84. One branch of T 84 is connected through a constant output pressure regulator 86 to a port 88 of a valve housing 90. A pipe 92 connects a port 94 of housing 90 with the front chamber 96 of a pneumatic cylinder 98, and a pipe 100 connects a port 102 of housing 90 with the rear chamber 104 of cylinder 98. A piston 106 is slidably located in cylinder 104 and appropriate stops 108 and 110 fastened to cylinder 98 limit the maximum forward and backward movement, respectively, of piston 106. Piston 106 is connected to the electrodes of spot welding gun 43 in such a manner that extension of piston 106 clamps the electrodes onto the metal being welded.

Valve housing 90 has a port 112 vented to the atmosphere. A valve body 114 having a direct portion 116 and a reversing portion 118 is mounted slidably in housing 90. Located between body 114 and the bottom of housing 90 is a compression spring 122 and attached to the other end of body 114 is a solenoid 124. When solenoid 124 is relaxed, spring 122 pushes direct portion 116 of valve body 114 into a position where port 88 communicates with port 94 and port 102 communicates with port 112. Regulated air pressure from regulator 86 then is applied through pipe 92 to front chamber 96, thereby retracting piston 106 to open the welding electrodes. With body 114 in this position, rear chamber 104 is vented through pipe 100 to atmosphere. When solenoid 124 is activated, it moves reversing portion 118 into a position where port 88 communicates with port 102 and port 84 communicates with port 112. Air pressure from regulator 86 then is applied through pipe 100 to rear chamber 104, thereby extending piston 106 to clamp the electrodes on the work.

The other branch of T 84 is connected through a similar constant output pressure regulator 86' to a port 88' of a valve housing 90'. Housing 90' has ports 94', 102' and 112' with port 112' vented to the atmosphere. A valve body 114' having a direct portion 116' and a reversing portion 118' is slidable in housing 90' with a compression spring 122' located between body 114' and the bottom of housing 90' and a solenoid 126 attached to the other end. When solenoid 126 is relaxed, spring 122' moves direct portion 116' into a position where it connects port 88' with port 94' and port 102' with port 112'. When solenoid 126 is activated, reversing portion 118' connects port 88' with port 102' and port 94' with port 112'.

A pipe 128 connects port 94' to the rear chamber 130 of vertical cylinder 68 and to port 132 of directional air valve 54. A second pipe 134 connects port 102' to the front chamber 136 of vertical cylinder 68 and to port 138 of directional valve 54. A piston 133 is mounted slidably in cylinder 68 and is attached to rod 70. Appropriate stops 131 and 137 are located in vertical cylinder 68 to limit maximum upward and downward movement, respectively, of piston 133.

A port 140 of directional valve 54 is connected through two check valves 142 and 144 in parallel to the front chamber 146 formed by piston 149 in horizontal cylinder 52. Piston 149 is attached to rod 53. Check valve 142 permits fluid to pass from port 140 into chamber 146 only after a predetermined pressure differential exists, while check valve 144 permits fluid to pass from chamber 146 to port 140 at a much lower pressure differential but at a controlled rate designed to control the speed of piston 149. Similarly, a port 148 of directional valve 54 is connected through two check valves 150 and 152 in parallel to the rear chamber 154 of horizontal cylinder 52. Check valve 150 permits fluid to pass from port 148 to chamber 154 only after a predetermined pressure differential exists while check valve 152 permits fluid to pass from chamber 154 to port 148 at a much lower pressure differential but again at a controlled rate. Stops 147 and 155 located in horizontal cylinder 52 limit maximum extension and retraction, respectively, of piston 149.

The valve body 156 of directional valve 54 comprises a direct portion 158 that connects port 132 with port 140 and port 148 with port 138 when in the operating position, and a reversing portion 160 that connects port 132 with port 148 and port 140 with port 138 when in the operating position. Solenoids 56 and 58 are connected to opposite ends of body 156 so excitation of solenoid 58 moves portion 158 into the operating position and excitation of solenoid 56 moves portion 160 into the operating position.

Figure 7B:
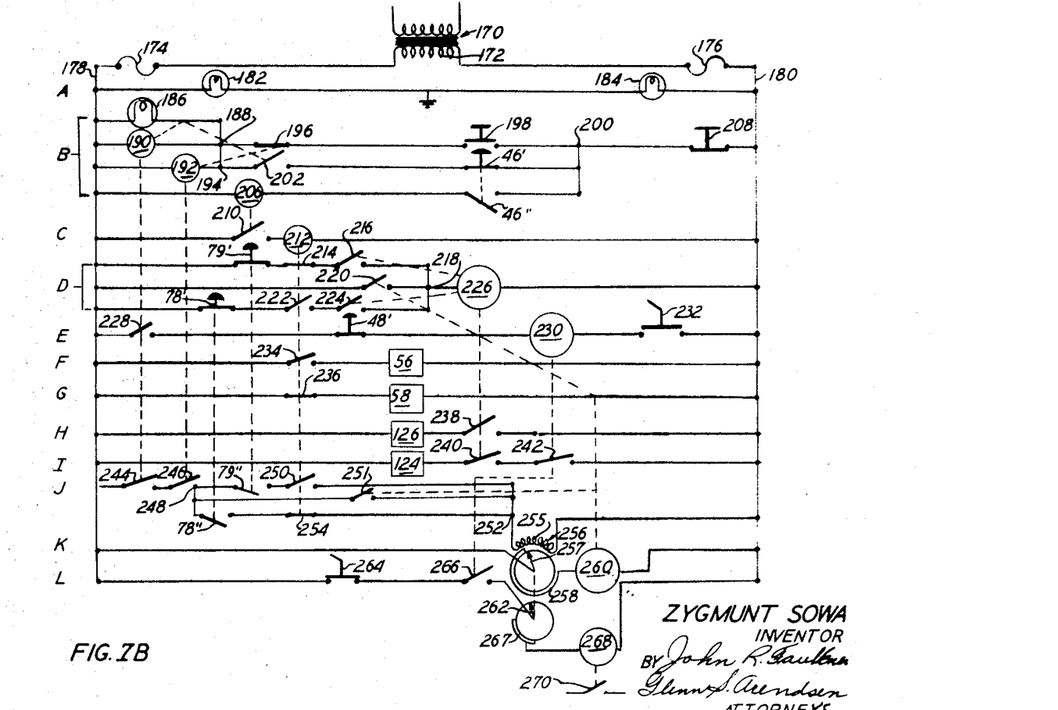

Turning to the electrical circuit shown in FIGURE 7b, an input transformer 170 has its output winding 172 connected through fuses 174 and 176 to buss leads 178 and 180, respectively. Each of the lines lettered A–L in the figure represent parallel connections between buss leads 178 and 180. Line A contains two warning lamps 182 and 184 that are lighted when power is being supplied to leads 178 and 180.

In line B, a warning lamp 186 is connected between lead 178 and a terminal 188. Also connected between lead 178 and terminal 188 is the winding of a starting relay 190. Each numbered circle in the diagrams represents the winding of the appropriate relay and contains appropriate rectifying means. A safety relay 192 connects lead 178 with a terminal 194 that is connected to terminal 188. A normally closed switch 196 in series with a push button starter switch 198 connects terminal 188 with terminal 200, and a normally open switch 202 in series with switch pole 46' located in reversing limit switch 46 connects terminal 194 to terminal 200. Switch 196 is operated by safety relay 192 and switch 202 is operated by relay 190, as indicated by the dashed connecting lines in the drawings. A ratchet relay 206 is connected through a second switch pole 46" located in limit switch 46 to terminal 200. Switch poles 46' and 46" are ganged together so pole 46' is normally closed and pole 46" is normally open. A normaly closed emergency stop switch 208 connects terminal 200 with buss lead 180 to complete line B.

Line C contains a switch 210 operated by ratchet relay 206 in series with a direction reversing relay 212. Switch 210 is open when the machine is indexing toward the right in FIGURE 1 and is closed by ratchet relay 206 when the machine is indexing toward the left.

In line D, switch pole 79' located in switch 79 in series with a switch 214 and a normally open switch 216 connect lead 178 with a terminal 218. Also connecting lead 178 with terminal 218 are a normally open switch 220, and switch pole 78' located in switch 78 in series with a switch 222 and a normally open switch 224. Terminal 218 is connected through a relay 226 to lead 180. Pole 78' is normally closed and opens when piston 149 of horizontal cylinder 52 is retracted to contact wing 76 with the plunger of limit switch 78 while pole 79' is normally closed and opens when piston 149 is extended. Switches 214 and 222 are operated by relay 212, and switch 214 is closed and switch 222 is open when the welding machine is indexing to the right in FIGURE 1. Switches 216 and 224 are operated by relay 226 and close when relay 226 is activated.

In line E, a normally open switch 228 is in series with the normally closed switch pole 48' of weld interrupting limit switch 48, welding relay 230 and normally open welding switch 232. Switch 228 is operated by relay 190 and closes when relay 190 is activated. Line F contains a switch 234 in series with the winding of solenoid 56, and line G contains a switch 236 in series with the winding of solenoid 58. Switches 234 and 236 are operated by relay 212 and switch 234 is open and switch 236 is closed when the welding machine is indexing to the right in FIGURE 1.

Line H contains the winding of solenoid 126 in series with a normally open switch 238 operated by relay 226, and line I contains the winding of solenoid 124 in series with a normally open switch 240 operated by relay 226 and a normally open switch 242 operated by relay 230.

In line J, a normally open switch 244 operated by relay 190 in series with a normally open switch 246 operated by relay 192 connect buss lead 178 with terminal 248. A second switch pole 79" located in switch 79 in series with a switch 250 connect terminal 248 with a terminal 252. A normally open switch 251 also connects terminals 248 and 252, and a second switch pole 78" in series with a switch 254 provides an additional parallel path from terminal 248 to terminal 252. Pole 78" is ganged to pole 78' and is open when pole 78' is closed. Pole 79" is ganged to pole 79' and also is open when pole 79' is closed. Switches 250 and 254 are operated by relay 212 and switch 250 is open while switch 254 is closed when the welding machine is indexing to the right in FIGURE 1. The winding 255 of a timer motor 256 connects terminal 252 with buss lead 180.

In line K, one rotating arm 257 of timer motor 256 is connected to lead 178. Arm 257 contacts a fail 258 during a portion of its rotation and foil 258 is connected to lead 180 through a relay 260. When activated, relay 260 closes switch 220 in line D and switch 251 in line J.

In line L, a second rotating arm 262 of timer motor 256 is connected to lead 178 through a normally open welding switch 264 and a normally open switch 266 operated by relay 230. Arm 262 is ganged for rotation with arm 256 and arm 262 contacts a foil 267 completely subtended by foil 258. Foil 267 is connected to lead 180 through a welding current relay 268. When actuated, relay 268 closes a switch 270 that applies welding current to the electrodes of gun 43.

Operation

As mentioned previously, FIGURE 7 shows schematically the configuration of the control circuits for the mechanism of this invention in a spot welding gun when it is stopped with piston 149 at some intermediate position. To start the mechanism, valve 84 is opened to admit air pressure to regulators 86 and 86' and an appropriate electrical switch (not shown) is closed to apply electric power to input transformer 170. Pressure applied through portion 116 to front chamber 96 of cylinder 98 retracts piston 106, thereby relaxing the electrodes of welding gun 43. Pressure applied through valve 90' to rear chamber 130 of vertical cylinder 68 extends pston 133 and arm 70 to engage teeth 72 with teeth 26 and then acts through flange 74 to raise arm 61 slightly, thereby disengaging teeth 41 of frame positioning member 39 from teeth 26. Assuming that ratchet relay 212 in line C has positioned switches 234 and 236 so solenoid 58 has moved direct portion 158 of directional valve 54 into the operating position, when sufficient pressure builds up in pipe 128, the pressure is applied through check valve 142 to front chamber 146 of horizontal cylinder 52, thereby retracting piston 149 which pulls carriage 60 to the trailer end of its movement, the position shown in FIGURE 1. This opens pole 78' in line D and closes pole 78" in line J, although neither of these operations has any immediate effect.

Lamps 182 and 184 are lighted by the electrical power transmitted through transformer 170 to leads 178 and 180 to warn the operator that the equipment is ready for use. Electric power suitable for welding also is turned on by appropriate means (not shown) and is applied up to switch 270 of FIGURE 7b. The operator then closes switches 232 and 264 to produce welding; if he desired to move the welding gun without welding, switches 232 and 264 would be left open.

By depressing momentarily start button 198, the operator begins operation of the welding gun. Lamp 186 lights to warn the operator that the equipment is in its operating cycle and relay 190 is actuated to close switches 202 in line B, 228 in line E, and 244 in line J. Safety relay 192 also is activated to open switch 196 in line B and close switch 246 in line J. Relays 190 and 192 are held in their activated states because switch 202 remains closed to complete the line B circuit even after start button 198 is released. Power applied through switches 228, 48', and 232 in line E activate relay 230 which closes switches 242 in line I and 266 in line L.

Since carriage 60 is at ts trailer end, pole 78' (line D) is open and pole 78" (line J) is closed. In line J, power applied through switches 244, 246, 78" and 254 to winding 255 starts motor 256. Motor 256 rotates arm 257 into touch with foil 258, thereby completing the circuit in line K to activate relay 260. Relay 260 closes switches 220 in line D and 251 in line J, the former activating relay 226 to close switches 216 and 224 in line D and switches 238 and 240 in lines H and I, respectively, and the latter producing an alternate circuit in line J. Solenoids 126 and 124 are activated by the completed circuits in lines H and I.

Solenoid 126 moves portion 118' of valve 90' into the operating position to apply air pressure through pipe 134 to front chamber 136 of vertical cylinder 68, thereby retracting piston 133. This retraction first lowers arm 61 which engages teeth 41 of frame positioning member 39 in teeth 26 and then retracts further to disengage teeth 72 of rod 70. When piston 137 reaches stop 131, the air pressure at port 148 exceeds the differential pressure setting of check valve 150 and is transmitted into chamber 154 where it extends piston 149 of horizontal cylinder 52. Since frame 28 is held in position by engagement of member 39 with teeth 26 and the carriage positioning member is free, this extension indexes carriage 60 toward the other end of its travel on main portion 34. As soon as piston 149 begins moving, the plunger of limit switch 78 is released, thereby opening pole 78" in line J and closing pole 78' in line D. Motor 256 continues to run, however, because of the alternate circuit in line J through switch 251.

Simultaneously with the above operation of solenoid 126, solenoid 124 moves portion 118 of valve 90 into the operating position. This applies regulated air pressure from regulating valve 86 to rear chamber 104 of cylinder 98. Regulating valves 86 and 86' are set, however, so piston 137 has retracted sufficiently to engage frame positioning member 39 with teeth 26 before piston 106 has extended sufficiently to clamp the electrodes of welding gun 43 on the work 44.

Figures 3, 4:
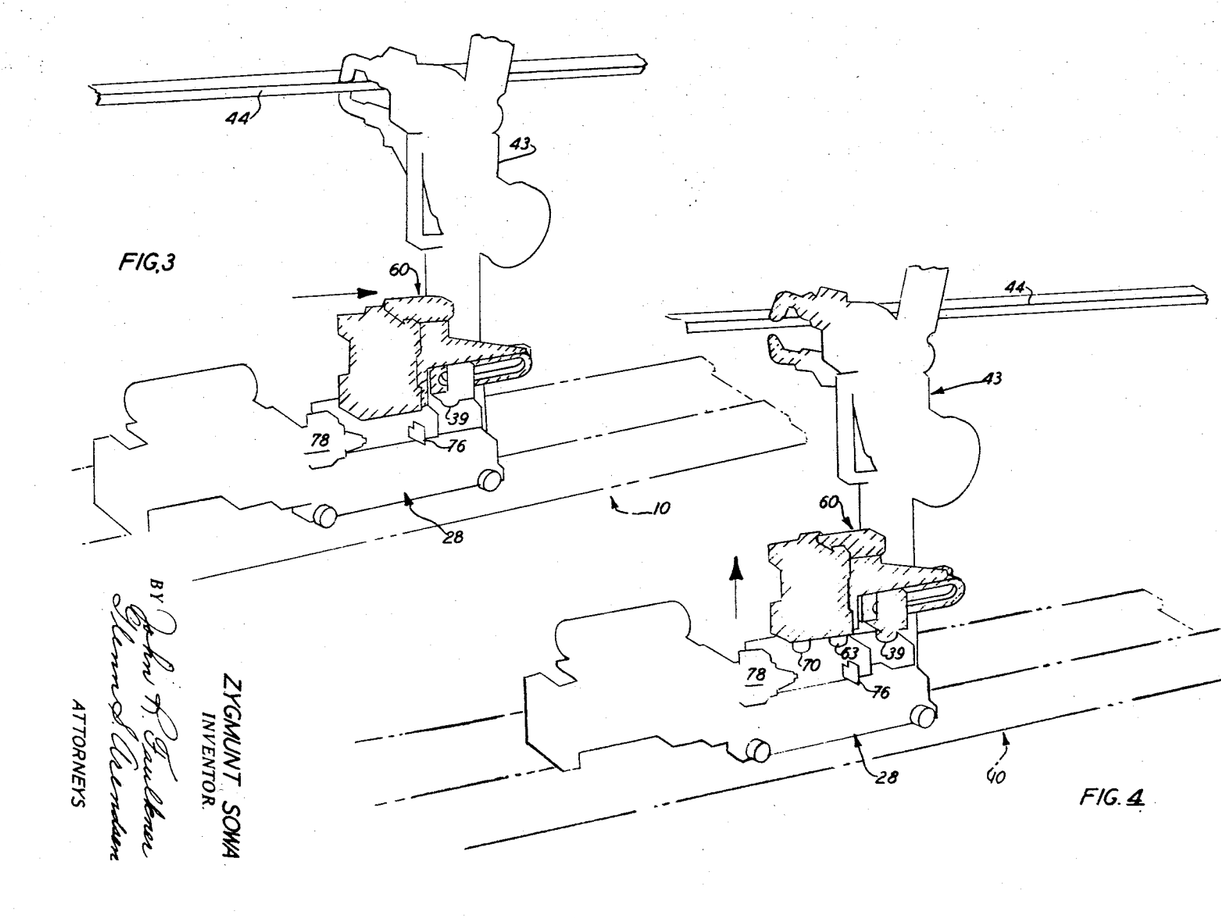
Figure 8A:
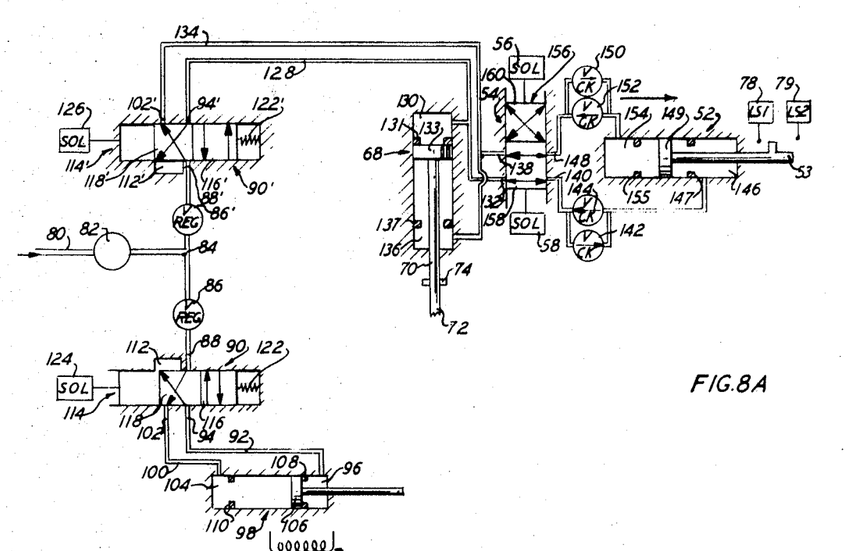
FIGURES 8a and 8b are schematics of the pneumatic and electrical systems with the gun welding and the carriage indexing, thus producing the situation shown in FIGURE 3.
Figure 8B:
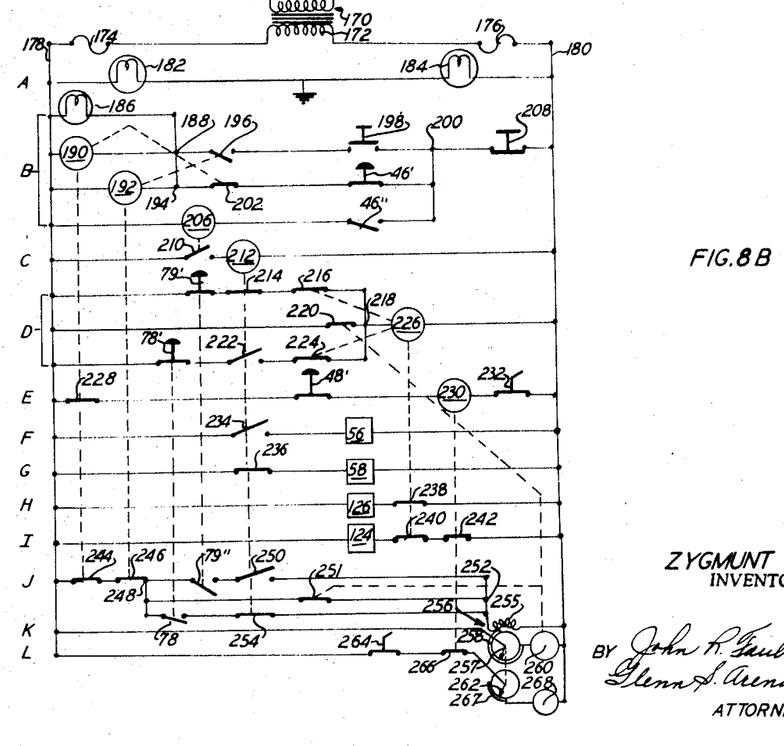

Meanwhile motor 256 continues to turn arm 257 and 262 until arm 262 contacts foil 267 to complete the circuit in line L, thereby activating relay 268. By this time piston 106 has fully extended to squeeze the work between the electrodes of gun 43. Relay 268 closes switch 270 to apply welding current to the electrodes of gun 43, thereby producing the weld. The control circuits then appear as shown schematically in FIGURES 8a and 8b and the machine is operating as shown in FIGURE 3 with gun 43 producing a weld on work 44 and indexing carriage 60 being moved to the right by the extension of horizontal cylinder 52.

During the welding cycle, piston 149 of horizontal cylinder 52 reaches its full extension where carriage 60 contacts the plunger of limit switch 79 to open pole 79' in line D and close pole 79" in line J. Neither of these operations has any immediate effect since motor 256 continues to run by virtue of closed switch 251 in line J and relay 226 remains activated by closed switch 220 in line D.

Figures 5, 6:
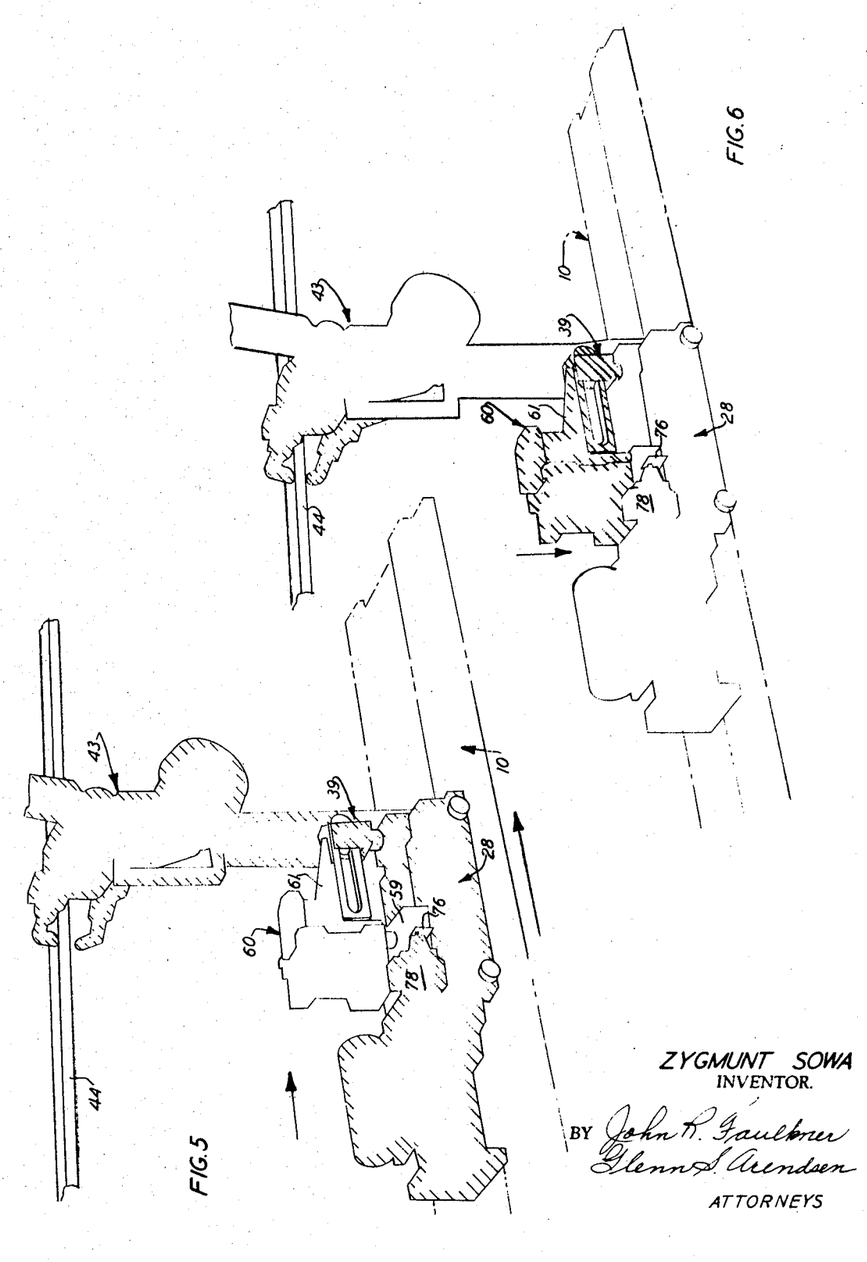
Figure 9A:
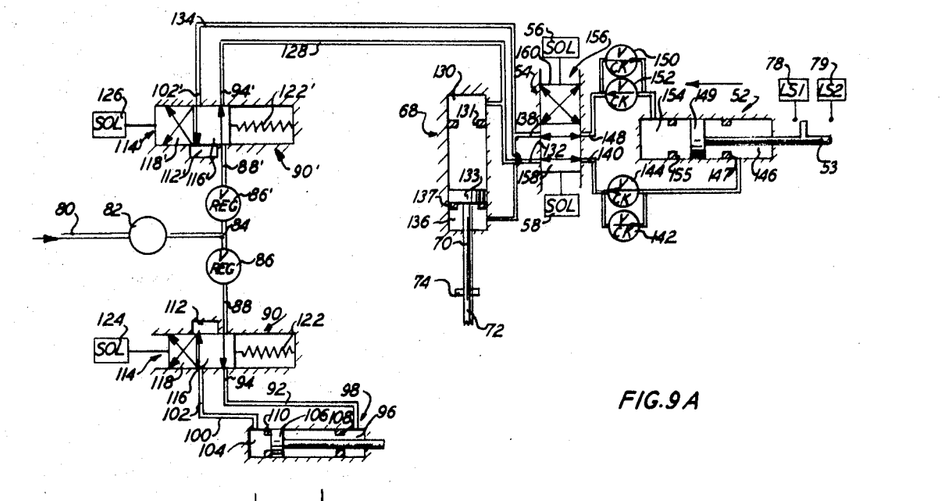
FIGURES 9a and 9b show the pneumatic and electrical systems when the weld cycle has ended and the frame is indexing, thereby producing the situation shown in FIGURE 5.
Figure 9B:
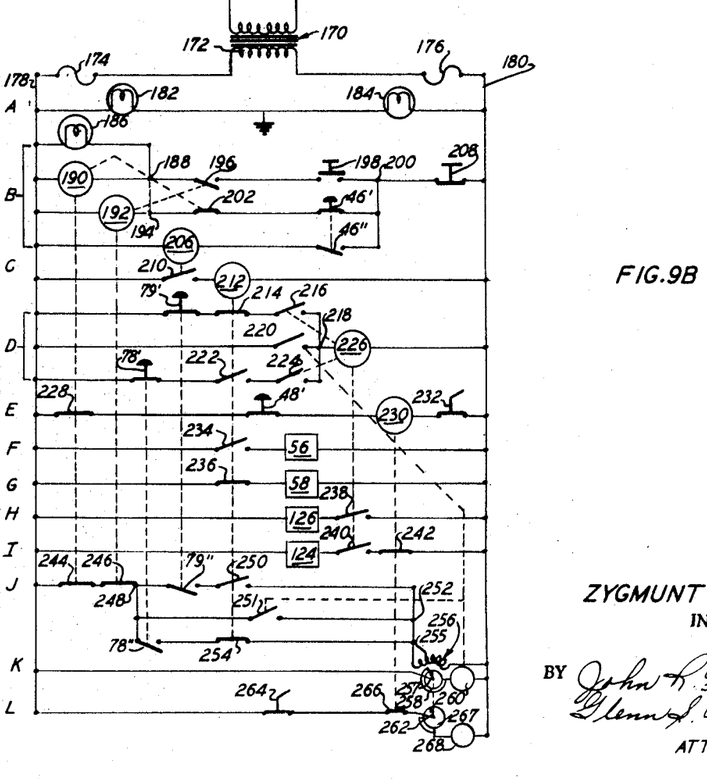

Motor 256 continues to turn to the point where neither of arms 257 or 262 is in contact with its appropriate foil, the position shown in FIGURE 9b. Relay 260 then relaxes to open switches 251 and 220, the former stopping motor 256 and the latter deactivating relay 226. Relay 226 opens switches 238 and 240 to deactivate solenoids 126 and 124, and springs 122 and 122' push direct portions 116 and 116' into the operating positions in valve housings 90 and 90', respectively, as shown in FIGURE 9a. Air pressure applied to front chamber 96 of cylinder 98 moves piston 106 rearward to relax the clamping force on the electrodes of welding gun 43. Air pressure applied through direct portion 116' first moves piston 133 of vertical cylinder 68 downward to engage gear teeth 72 with teeth 26, then lifts carriage 60 slightly to disengage gear teeth 41 of frame positioning member 39 (see FIGURE 4), and finally is admitted to front chamber 146 of horizontal cylinder 52 to begin retracting piston 149. Since carriage 60 is held in position on the track, retraction of piston 149 draws frame 28 up to the position of carriage 60 as illustrated in FIGURE 5. The configurations of the control circuits at this point are shown in FIGURE 9.

Note that it is not necessary for horizontal cylinder 52 to reach full extension before the motor completes its cycle. If motor 256 completes its cycle and deactivates relay 260 before carriage 60 reaches the end of its travel, pole 79' remains closed to keep relay 226 activated until carriage 60 is fully indexed.

When piston 149 reaches full retraction, wing 76 contacts the plunger of limit switch 78 to open pole 78' and close pole 78". This completes the circuit through line J to restart motor 256. The equipment operates as above to produce another spot weld and continues to operate in this manner until the machine produces the last spot weld on body member 44. This last weld is located just short of the point where the plunger of limit switch 46 contacts ramp 47. While the last weld is being made, carriage 60 indexes to the right in the normal manner as shown in FIGURE 3, and when the weld is completed, piston 133 of vertical cylinder 68 extends to engage teeth 72 with teeth 26 and disengage frame positionin gmember 39 from teeth 26, the operation produced by FIGURE 9 and shown in FIGURE 4.

Figure 10A:
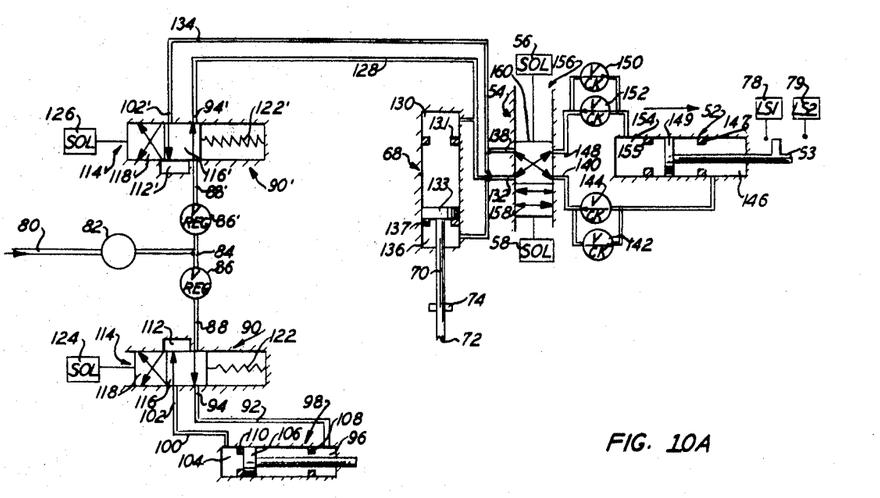
FIGURES 10a and 10b show the pneumatic and electrical systems when the machine reaches the end of the track and is setting up for operation in the reverse direction.
Figure 10B:
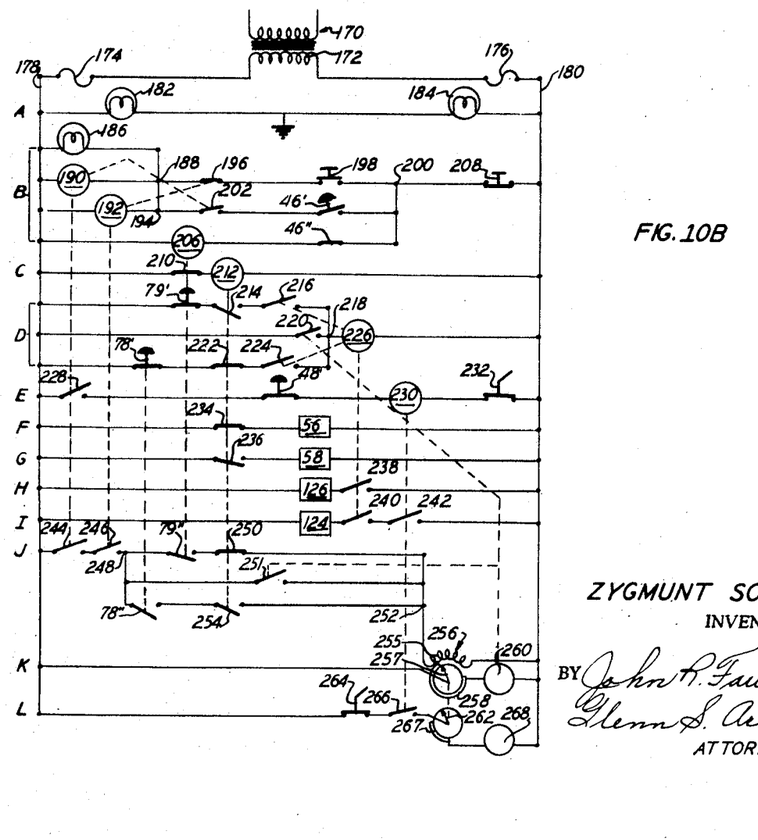

As plunger 149 retracts to draw frame 28 up to the next position, ramp 47 contacts the plunger of switch 46 and thereby opens pole 46' while closing pole 46" in line B of the electrical circuit (see FIGURE 10). Pole 46' breaks the circuit in line B to deactivate relays 190 and 192. Pole 46" completes the circuit through ratchet relay 206 to index the ratchet one step, thereby closing switch 210 in line C. Switch 210 completes the circuit through relay 212 which opens switch 214 and closes switch 222 in line D, closes switch 234 in line F, opens switch 236 in line G and closes switch 250 while opening switch 254 in line J.

This operation of switches 234 and 236 deactivate solenoid 58 and activate solenoid 56 to move reversing portion 160 of directional valve 52 into the operating position. The air pressure at port 132 is transmitted to port 148 and passes through check valve 150 to rear chamber 154 of horizontal cylinder 52, thereby reversing the direction of piston 149. Piston 149 moves the short distance back toward full extension. When piston 149 reaches stop 147, the equipment comes to a complete stop. Pole 79' is opened and pole 79" is closed by the action of the hidden wing on the plunger of limit switch 79. Note that the equipment has stopped with the gun electrodes exactly adjacent the last spot weld.

The welded body member 44 is removed and another set of members to be welded is positioned in its place. Again, the operator manually depresses start button 198 to begin operation in the reverse direction. Relays 190 and 192 are activated as described above to complete the circuit in line J through switches 244, 246, 79" and 250. Motor 256 begins turning and when arm 257 reaches foil 258, relay 260 is activated to close switches 220 and 251. Switch 220 activates relay 226 to close switches 216, 224, 228, and 240, the latter two switches activating solenoids 126 and 124, respectively.

Solenoid 126 applies pressure to front chamber 136 of vertical cylinder 68, thereby retracting piston 133 to engage frame positioning member 39 with teeth 26 and disengage teeth 72. As soon as member 39 is engaged, air pressure applied through portion 118 clamps the electrodes on the body member 44 as described above. This is the position shown in FIGURE 3 although the movement indicated by the arrow is not occurring.

Figure 11A:
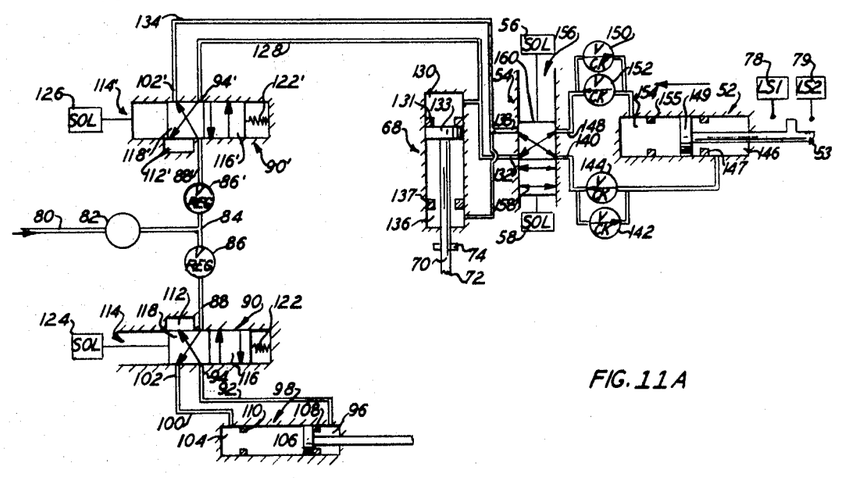
FIGURES 11a and 11b show the pneumatic and electrical systems when the frame is stationary, the gun is welding, and the horizontal cylinder is retracting to index the carriage while the machine is operating in the reverse direction.
Figure 11B:
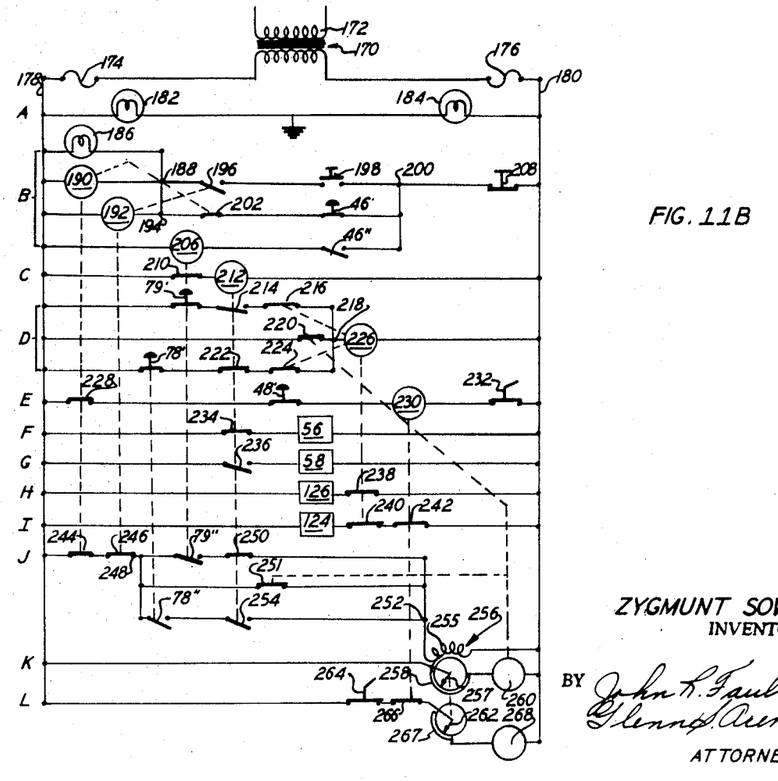

Directional valve 52 and check valve 142 then apply air pressure to front chamber 146 of horizontal cylinder 52. Piston 149 begins retracting, but since frame 28 is held in position, the retraction moves carriage 60 from the position shown in FIGURE 3 to the position shown in FIGURE 6. During this retraction, motor 256 has continued to operate, and the first spot weld has been produced on the new body member 44 (see FIGURE 11). Pole 78' in line D opens and pole 78" in line J closes when wing 76 contacts the plunger of limit switch 78.

When motor 256 reaches the end of its timing cycle, solenoids 126 and 124 are relaxed as described above. This releases the welding electrodes and extends piston 133 of vertical cylinder 68 to engage teeth 72 with teeth 26 and disengage teeth 41. Shortly thereafter, air pressure from port 132 of directional value 52 is applied through check valve 150 to rear chamber 154 of horizontal cylinder 52 which extends piston 149. Since carriage 60 now is held in position, the extension of piston 149 moves frame 28 to the left, thereby indexing the frame to the next spot weld. When piston 149 has fully extended, the hidden wing on carriage 60 contacts the plunger of limit switch 79 to close pole 79" in line J and open pole 79'. This starts motor 256 again and the equipment produces another weld. The machine continues indexing to the left in this manner until it reaches the left end of track 10 where a ramp similar to ramp 47 contacts the plunger of limit switch 46 to again set up the equipment for operation in the reverse direction and stop the equipment.

As mentioned previously, the equipment can be indexed without welding by keeping switches 232 or 264 open. Two welding switches (232 and 264) are provided in the circuit as a safety measure. Welds can be omitted automatically by locating a ramp member 280 (see FIGURE 1) at the appropriate place along track 10 where it contacts the plunger of switch 48 to open pole 48' in line E. Pole 48' then deactivates relay 230 which opens switch 266 in line L. The equipment then indexes without welding until the plunger of switch 48 clears ramp 280. Ramp 280, of course, can be of any desired length.

The equipment can be adapted to produce single welds by connecting relay 260 to switch 202 through a lost motion device so switch 202 can be closed while relay 260 is deactivated but will be opened when relay 260 changes from its activated to its deactivated state. An overriding means preventing relay 260 from opening switch 202 is used to permit the continuous operation described above.

Safety relay 192 also operates a normally open switch (not shown) located in the circuit supplying welding current to the electrodes of the welding gun and is strictly a safety measure designed to prevent injury from the welding current during loading and unloading the work in case of a failure of the conventional safety equipment in that circuit. A single two way check valve can be used in place of valves 142 and 144 and in place of valves 150 and 152 if desired. In addition, the stops for the pneumatic cylinders can be located on the frame or carriage instead of in the cylinders.

With welds less than 4-6 inches apart, the spot welding machine having the indexing mechanism of this invention produces welds at the rate of approximately one per second. Various adjustments and modifications can be made to reduce or increase this rate as desired. Having gear teeth as the stop means permits adjustment of the spot welds longitudinally along the track, although once such an adjustment is made, the mechanism produces welds in the same locations while indexing in either direction. Such an adjustment is effected by turning off the air pressure and electricity, manually disengaging the frame positioning member, and sliding the equipment to the new location desired for the first spot weld. Ramps can be provided to guide up or down the spot welding gun, which then is slidable with respect to the frame, to follow vertical changes in the work. Multiple electrodes can be used to weld at different horizontal or vertical positions if desired, but multiple electrodes welding on the same surface usually are unnecessary because of the speed of the mechanism.

Thus, this invention provides an indexing mechanism that indexes a uniform distance in either direction along a track during each cycle. The mechanism has been adapted for use on spot welding guns producing spot welds on vehicle body floor pans, fenders, quarter panels, cowl assemblies, instrument panel assemblies and other sheet metal components rapidly and efficiently. In addition to its utility in welding machines of all types, the mechanism of this invention can be used on drilling equipment, stapling equipment, nailing or tacking equipment, stitching equipment, or any other equipment where successive operations are performed. Its control circuit permits the equipment to operate while indexing in either direction along its track, produce single or sequential operations, omit certain operations while continuing to index, or index the entire length of the track without an operation.

What is claimed is:
1. In a movable spot welding machine having a frame carrying a spot welding gun along a track, the improvement comprising
   stop means positioned on said track,
   a first motive device fastened to said frame and acting parallel to said track,
   a frame positioning member slidable in said frame to engage and disengage said stop means, and
   an indexing carriage mounted on said frame for movement relative to said frame by said first motive device, said indexing carriage comprising an arm extending parallel to the plane of said track and a second motive device attached to said arm, said frame positioning member riding on said arm, said second motive device engaging a carriage positioning member with said stop means when disengaging said frame positioning member from said stop means and disengaging the carriage positioning member when engaging the frame positioning member.

2. The machine of claim 1 in which activation of the second motive device sequentially engages the carriage positioning member with the stop means and disengages the frame positioning member from the stop means.

3. The machine of claim 2 comprising a control means for actuating simultaneously the spot welding gun to produce a spot weld and the first motive device to index the carriage.

4. The machine of claim 3 in which the control means comprises a timer means for deactivating the second motive device to engage the carriage positioning member and disengage the frame positioning member sequentially after actuating the spot welding gun and the first motive device.

5. The machine of claim 4 in which the first and second motive devices are fluid operated pistons.

6. The machine of claim 5 in which the control means comprises means for producing spot welds while the machine is indexing in either direction.

7. The machine of claim 6 comprising means for omitting a spot weld while continuing to index.

References Cited

UNITED STATES PATENTS

| | | |
|---|---|---|
| 2,913,567 | 11/1959 | Stolz. |
| 3,068,346 | 12/1962 | Tribe. |
| 3,182,177 | 5/1965 | Anderson. |
| 3,210,519 | 10/1965 | Kerchoff. |
| 3,294,948 | 12/1966 | Fegley et al. |
| 3,426,171 | 2/1969 | Pedcey. |

JOSEPH V. TRUHE, Primary Examiner

B. A. STEIN, Assistant Examiner

U.S. Cl. X.R.

219—87